United States Patent [19]

Wander

[11] Patent Number: 5,472,254
[45] Date of Patent: Dec. 5, 1995

[54] SCAFFOLDING HOIST COUPLING

[76] Inventor: Kenneth V. Wander, 9333 185th Ave., Becker, Minn. 55308

[21] Appl. No.: 174,210

[22] Filed: Dec. 28, 1993

[51] Int. Cl.⁶ .................................................. E04G 5/00
[52] U.S. Cl. ...................... 294/82.35; 403/316; 403/319; 403/321; 403/322; 403/324
[58] Field of Search ............................ 182/141; 254/409; 294/82.23, 82.35; 403/316, 319, 321, 322, 323, 324, 325, 353, 360

[56] References Cited

U.S. PATENT DOCUMENTS

| | | | |
|---|---|---|---|
| 1,740,782 | 12/1929 | Ratigan | 294/82.23 |
| 2,489,864 | 11/1949 | Cravener | 294/82.35 |
| 2,626,821 | 1/1953 | Bonget et al. | 403/1 |
| 3,123,881 | 3/1964 | Westman | 403/353 X |
| 3,294,053 | 12/1966 | Emery, Jr. | 403/319 X |
| 3,464,093 | 9/1969 | Laharty | 403/353 X |
| 3,486,206 | 12/1969 | McCarthy | 294/82.23 |
| 4,091,640 | 5/1978 | Olkowski, Jr. et al. | 64/4 |
| 4,258,888 | 3/1981 | Sawn | 403/316 X |
| 4,264,098 | 4/1981 | Haake | 294/82.35 |
| 4,277,934 | 7/1981 | Rieck | 403/325 X |
| 4,398,762 | 8/1983 | Haeussler et al. | 294/82.23 X |
| 4,573,725 | 3/1986 | Griffiths | 403/322 X |
| 4,585,369 | 4/1986 | Manesse et al. | 294/82.35 X |
| 4,708,524 | 11/1987 | Goris | 403/322 X |
| 5,318,375 | 6/1994 | Entrup et al. | 403/359 |
| 5,407,293 | 4/1995 | Crainich | 403/322 |

FOREIGN PATENT DOCUMENTS

| | | | |
|---|---|---|---|
| 3636130 | 1/1988 | Germany | 294/82.23 |
| 379511 | 4/1973 | U.S.S.R. | 294/82.35 |
| 748064 | 7/1980 | U.S.S.R. | 403/323 |

OTHER PUBLICATIONS

"Tube–n–Clamp Scaffold/Crab System Scaffold", *Bil–Jax, Inc., Scaffold & Related Equipment*, Catalog No. 191, copyright 1991, published on date even with or prior to Dec. 27, 1993.

*Primary Examiner*—Dave W. Arola
*Assistant Examiner*—Andrea Chop
*Attorney, Agent, or Firm*—Nawrocki, Rooney & Sivertson

[57] ABSTRACT

A scaffolding hoist coupling for lifting a scaffolding component, the component having an operably connected post fitting having at least two pins extending outwardly. The scaffolding hoist coupling includes a housing having an opening in one end, the housing being configured to receive a portion of the post fitting including the pins. The scaffolding also includes a retaining device proximate the opening for releasably retaining the portion of the post fitting including the pins. A fastening device is connected to the housing for fastening the scaffolding hoist coupling to a hoist line. A method for coupling scaffolding components to a hoist is also discussed.

13 Claims, 2 Drawing Sheets

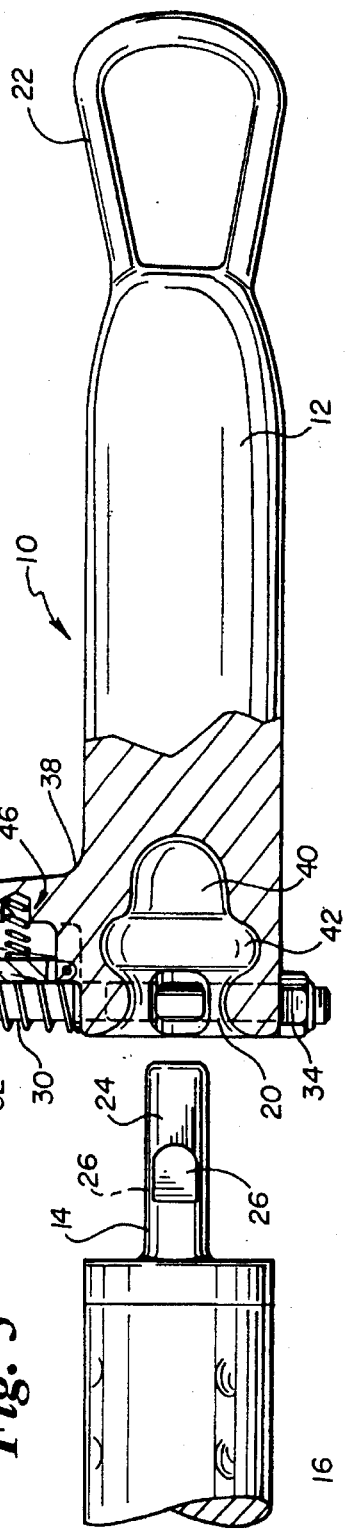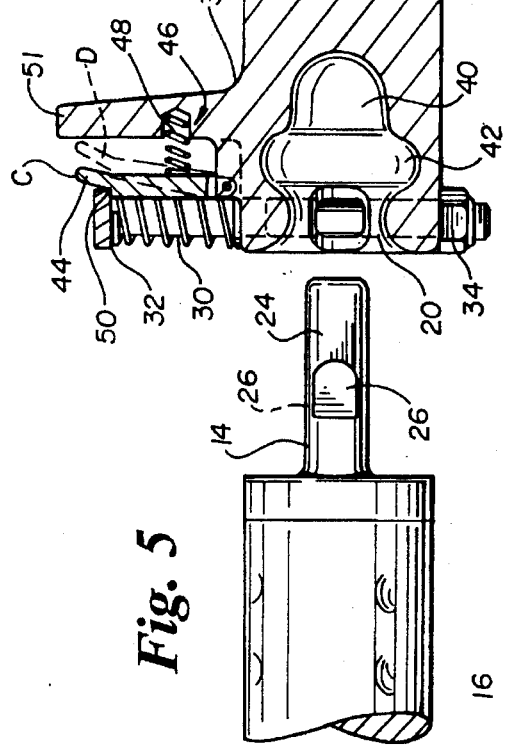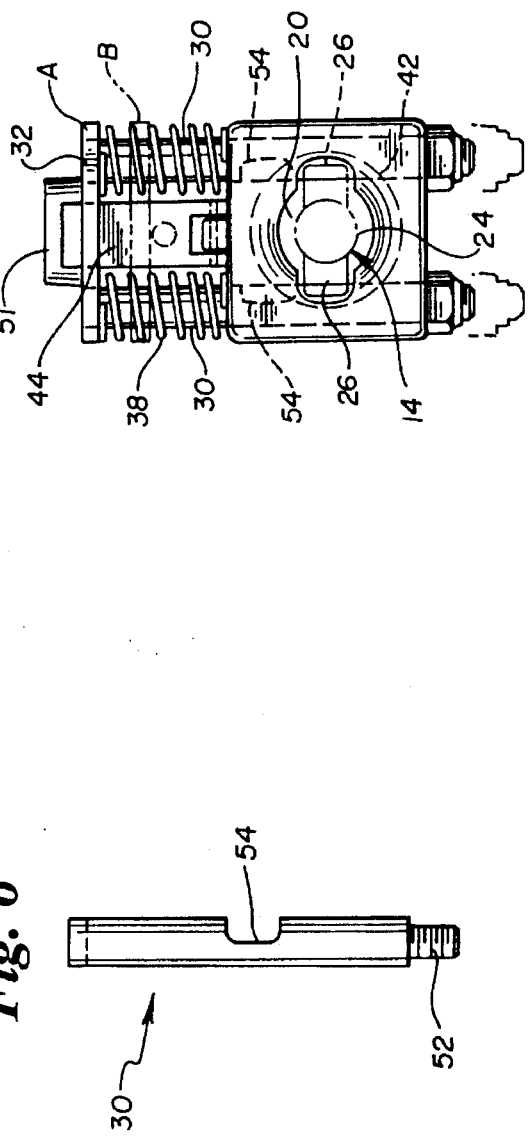

SCAFFOLDING HOIST COUPLING

BACKGROUND OF THE INVENTION

The present invention pertains generally to the field of scaffolding, and in particular to a scaffolding hoist coupling for lifting a scaffolding component.

Scaffolding is used to construct a temporary structure or scaffold. A scaffold is generally constructed to provide temporary access to the interior or exterior of a permanent structure. The scaffold may be many stories tall and include horizontal platforms at several elevations to provide a place for workers and their equipment adjacent the permanent structure. Access to the permanent structure provided by the scaffold may be used for painting or finishing a surface of the permanent structure. Other uses of a scaffold are well known in the art.

A scaffold is often assembled by inter-connecting tubular columns and beams to form a rigid frame-work. The tubes are usually steel, and prefabricated in various nominal lengths. As the scaffold is assembled, the tubes and other scaffolding components must be hoisted to where they will be incorporated into the scaffold.

Prior to Applicant's invention, one method of hoisting tubes required looping the hoist line and friction fitting a clamp around the tube. The clamp was placed proximate one end of the tube to prevent the looped line from sliding off the end of the tube. Generally, a clamp was not placed at the other end of the tube.

The clamps used were typically attached by sliding them over one end of the tube and tightening the clamp by turning a nut with a wrench. After the tube was hoisted to where it was needed, the clamp was removed from the tube by turning the nut with a wrench to loosen the clamp. The clamp was then set aside for possible later use in fastening the tubular members together to construct the scaffold. If the clamps are not used or incorporated into the scaffold, a surplus of clamps may develop on the scaffold.

SUMMARY OF THE INVENTION

The present invention provides a scaffold hoist coupling that can be operated with one hand unassisted by additional tools. The coupling of the present invention can be used to reduce the time needed to fasten a scaffolding component to and unfasten a scaffolding component from a hoist. Use of the hoist coupling of the present invention can thus speed assembly of a scaffold. The hoist coupling in accordance with the present invention may be weighted to plumb the hoist line. Plumbing the hoist line improves control of the line in adverse wind conditions. Unlike the prior method of hoisting scaffolding components, a clamp is not removed from the scaffolding component when the scaffolding component is hoisted to where it will be incorporated into the scaffold. Thus a surplus of unneeded clamps will not accumulate on the scaffold platform.

The present invention takes advantage of the fact that ends of scaffolding tubes often have mating fasteners. The fasteners enable the tubes to be connected end to end such that two or more tubes can be fastened together to form a longer tubular member. Twist lock fasteners are often used to fasten the tubes together. Twist lock fasteners generally include a fitting having two pins extending outwardly and a fitting having an opening configured to receive the post and pins. Once the post is inserted into the opening the tube fittings are rotated relative to each other about the post to engage the pins with an interior surface of the fitting having the opening.

The scaffolding hoist of the present invention is for lifting a scaffolding component having an operably connected post fitting with at least two lateral projections. Scaffolding tubes commonly have such fittings, for example, the mating fitting described above, but it is anticipated that other scaffolding components can be similarly equipped.

The hoist coupling may include a housing having an opening in an end configured to receive the fitting. The opening preferably has a cross-section generally corresponding in shape to a cross-section of the fitting taken through the projections.

The coupling also includes a retaining device disposed proximate the opening for releasably retaining a portion of the fitting including the projections. The retaining device may be movable between a first position and second position so that when the retaining device is in the second position the opening is unobstructed for receiving and removal of the fitting. When the retaining device is in the first position a portion of the cross-section of the opening corresponding generally in shape to the projections is obstructed. The obstruction may engage with the projections when the portion of the fitting including the projections is received in the opening.

The coupling also preferably includes a fastening device to fasten the coupling to a hoist. The housing may be generally cylindrical and the fastening means may be disposed proximate an end opposite the opening. The fastening device may include a loop. The retaining device may include two approximately parallel elongated locking members each having a notch generally corresponding in shape to a portion of the cross-section of the opening generally corresponding in shape to the projection. The locking members are preferably movable between a first position and a second position. When the locking members are in the second position, the notches are aligned with the portion of the cross-section of the opening generally corresponding in shape to the projections to allow insertion or removal of the fitting. When the locking members are in the first position a portion of the cross-section of the opening generally corresponding in shape to the projections is obstructed by the locking members. In the first position, the locking members may engage with the projections when the portion of the fitting including the projections has been inserted into the opening.

The retaining device may include a biasing member or spring for biasing the locking members toward the first position. The retaining device may also include a depressible member operably connecting the locking members. The depressible member preferably can be depressed to move the locking members from the first position to the second position. The hoist coupling may also include a shield proximate the depressible member to at least partially shield the depressible member. The coupling may also include a latch operably engageable with the locking members to secure the locking members in the first position.

In accordance with the present invention a method of coupling scaffolding components to a hoist is provided. The method includes the steps of fastening a coupling having an opening in an end to the hoist. Then a fitting operably connected to the scaffolding component is inserted into the opening. The fitting is then positioned in the opening relative to the couplings so that the fitting engages with an interior surface of the coupling.

BRIEF DESCRIPTION OF THE DRAWINGS

FIG. 4 shows a side view of the scaffolding hoist coupling partially broken away;

FIG. 5 shows a side view of a post fitting connected to a scaffolding component;

FIG. 6 shows a locking member in accordance with the present invention; and

FIG. 7 shows an end view of the scaffolding component including the opening.

DETAILED DESCRIPTION OF THE INVENTION

Figure 1:
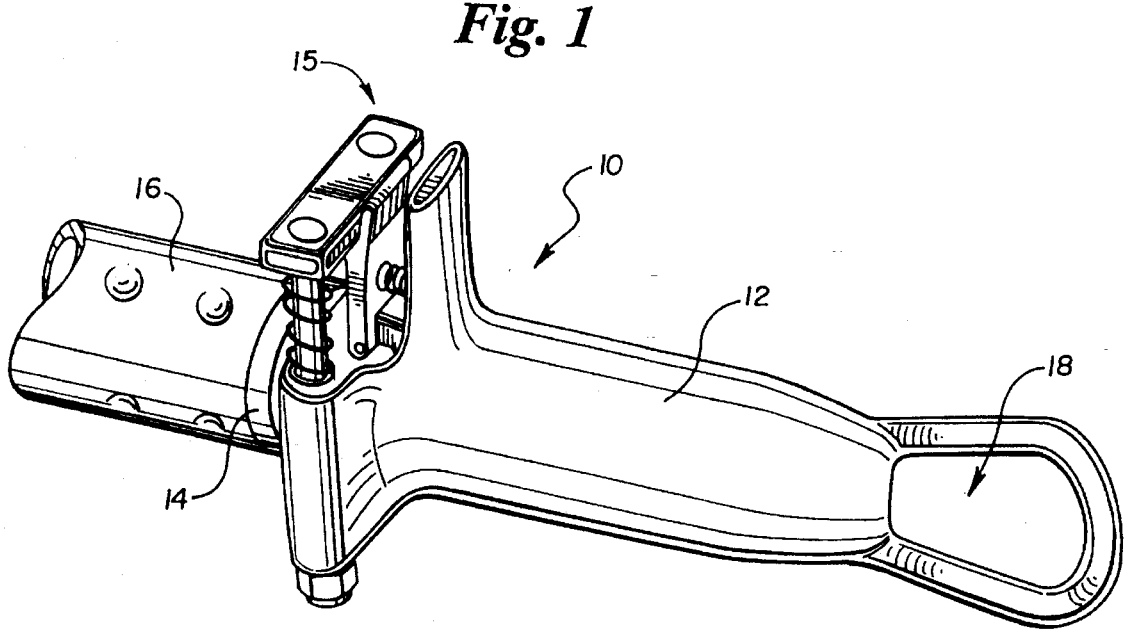
FIG. 1 shows a scaffolding hoist coupling in accordance with the present invention coupled to a scaffolding component.

Referring now to the drawings, wherein like reference numerals designate like elements throughout the several views, FIG. 1 shows a scaffolding hoist coupling 10 in accordance with the present invention. Coupling 10 includes a housing 12. Connected to housing 12 is a retaining means 15 for releasably retaining a post fitting 14 operably connected to a scaffolding component 16. Also connected to the housing is a fastening means 18 for fastening the coupling to a hoist line (not shown).

A scaffolding hoist coupling 10 in accordance with the present invention provides a coupling that can be operated by one hand unaided by additional tools. Coupling 10 can be used for lifting any type scaffolding component having a fitting 14 engageable with retaining means 15. With the present invention, the time needed to fasten a scaffolding component to or unfasten a component from the hoist is significantly reduced. Use of coupling 10 can reduce the assembly time of a scaffold.

Figure 2:
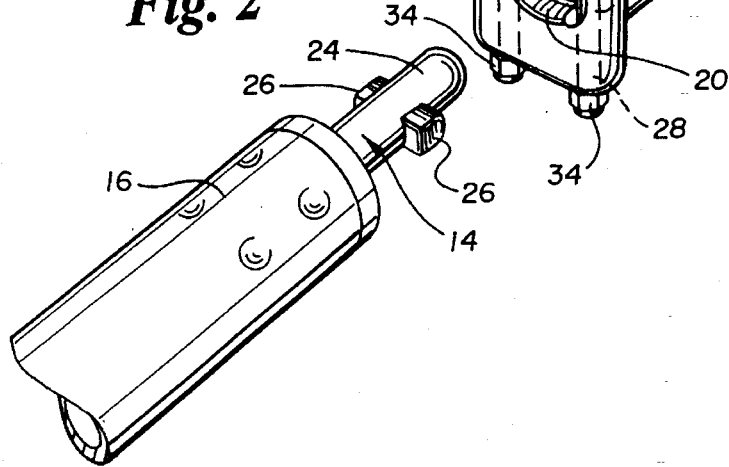
FIG. 2 shows a post fitting connected to an end of a scaffolding component.

FIG. 2 shows a typical scaffolding component 16, in this case a tube, having an operably connected post fitting 14. In a preferred embodiment post fitting 14 may include an elongated generally cylindrical post 24 having two outwardly disposed pins 26. Post 24 need not be generally cylindrical to be consistent with the present invention, but rather may be configured to support one or more lateral projections such as pins 26.

Figure 3:
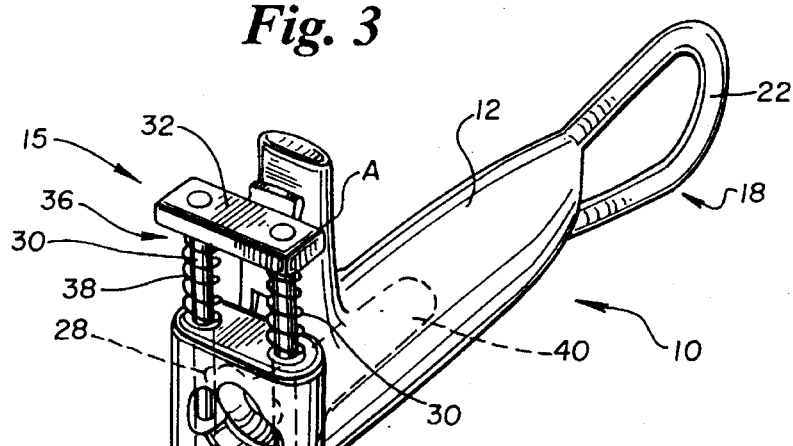
FIG. 3 shows an opening into an end of the scaffolding component.

As shown in FIG. 3, housing 12 may define an opening 20 proximate retaining means 15. In a preferred embodiment, the latitudinal cross section of opening 20 may correspond in shape to the latitudinal cross section through pins 26 of post fitting 14. Housing 12 may have an elongated generally cylindrical shape with a loop 22 as fastening means 18. Other fastening means in addition to loops may also be used in accordance with the present invention.

As shown in FIG. 3, retaining means 15 may include two generally parallel bores 28 disposed on opposite sides of opening 20. Bores 28 may be defined by a portion of housing 12 or by another member operably connected to housing 12. Bores 28 preferably intersect the portions of opening 20 generally corresponding in shape to pins 26.

A locking member 30 may be slidably mounted within each bore 28. Locking members 30 may be joined at one end by a depressible member 32. Bolts 34 or other similar members may be fastened to the opposite ends of locking members 32 to prevent locking members 30 from sliding out of bores 28.

Biasing means 36 for biasing locking members 30 into a first position A as shown in FIG. 3 are preferably helical springs 38 placed around locking members 30. Any other suitable biasing means known in the art may also be used to bias locking members 30 into the first position.

FIG. 4 shows a side view of coupling 10 partially broken away proximate opening 20. Opening 20 may open into a hollow region 40 within housing 12. Hollow region 40 preferably extends sufficiently far into housing 12 to allow pins 26 of fitting 14 to be positioned inwardly of locking members 30 when fitting 14 is inserted therein. Hollow region 40 may include a widened portion 42 having a latitudinal cross section which allows rotation of fitting 14 about the longitudinal axis of post 24 when the pins are in portion 42.

The remainder of housing 12 may be filled with a heavy material such as steel, sand or lead as ballast to plumb the hoist line. In one embodiment, the coupling 10 weighs approximately four pounds. This weight is believed to provide sufficient ballast to plumb the hoist line in adverse wind conditions. It is anticipated, however, that not all couplings 10 in accordance with the present invention need to incorporate this feature.

A latch 44 may be pivotably mounted to housing 12. Latch 44 may be movable between a first position C and a second position D. A biasing means 46 for biasing latch 44 toward first position C may be a helical spring 48 as shown in FIG. 4. Other biasing means as known in the art may also be used in accordance with the present invention.

Latch 44 may include a notch 50 engageable with depressible member 32 when locking members 30 are in first position A. When latch 44 is in first position C and notch 50 engaged with depressible member 32, locking members 30 are restrained from movement from the first position A. When latch 44 is moved to the second D position, however, locking members 30 are preferably free to slide within bores 28.

Coupling 10 may also include a shield 51 operably connected to housing 12. Shield 51 may protect depressible member 32 and/or latch 44 from unintentional impact which could move locking members 30 from first position A.

FIG. 5 shows scaffolding component 16 in a proper relative position for insertion into opening 20 of hoist coupling 10 shown in FIG. 4. Note that pin 26 is aligned with the correspondingly shaped portion of opening 20.

FIG. 6 shows a preferred embodiment of a locking member 30 having a threaded end 52 for threadably receiving nut 34. Locking member 30 also preferably includes a notch 54 generally corresponding in shape to an end of pin 26.

It is anticipated that coupling 10 may be used in a harsh environment where it may be exposed to high impacts and weather. Coupling 10 also must be sufficiently strong to survive the loading of various scaffolding components. Consequently, coupling 10 is preferably made from strong durable materials such as, but not limited to, steel, aluminum or fiberglass.

In use, fitting 14 may be inserted into opening 20 as shown in FIG. 7. To accomplish this, latch 44 is moved from first position C to second position D, and depressible member 32 depressed to move locking members 30 from first position A (shown in solid line) to a second position B (shown in broken line). When locking members 30 are in second position B, notches 54 are aligned with the portions of opening 20 corresponding in shape to pins 26. Thus, fitting 14 may be inserted into opening 20 sufficiently far that pins 26 are disposed inwardly of locking members 30. Depressible member 32 may be released so that springs 38 will bias locking members 30 back to first position A and spring 48 may bias latch 44 back to first position C. When locking members 30 are in first position A, the portion of opening 20 corresponding to pins 26 is obstructed by locking members 30 and retaining pins 26 and consequently fitting 14 are retained within housing 12. Locking members 30 can be moved back to second position B as described above to remove fitting 14.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A scaffolding hoist coupling, for lifting a scaffolding component, the component having an operably connected post fitting having at least two pins extending transversely from an elongated post, comprising:

a housing having a first end and a second end and an opening in the first end configured to receive the post fitting, the opening generally corresponding in shape to a projection of the post fitting taken transversely to the elongated post;

retaining means, proximate the opening, for releasably retaining a portion of the post fitting including the pins, the retaining means being movable between a first position and a second position so that when the retaining means is in the second position, the opening is unobstructed for receiving and removal of the post fitting and when the retaining means is in the first position a portion of the opening corresponding in shape to the pins is obstructed for engagement with the pins when the portion of the post fitting including the pins is received in the opening; and fastening means, connected to the housing, for fastening the scaffolding hoist coupling to a hoist line.

2. A scaffolding hoist coupling, in accordance with claim 1, the housing being generally cylindrical and the fastening means being disposed proximate the second end of the housing opposite the opening.

3. A scaffolding hoist coupling, in accordance with claim 2, the fastening means including a loop fastened to the second end of the housing opposite the opening.

4. A scaffolding hoist coupling, in accordance with claim 1, the retaining means including two approximately parallel elongated locking members, each having a notch generally corresponding in shape to the portion of the opening generally corresponding in shape to the pins, the locking members being movable between the first position and the second position so that when the locking members are in the second position the notches are aligned with the portion of the opening generally corresponding in shape to the pins for receiving and removal of the post fitting, and when the locking members are in the first position, the portion of the opening generally corresponding in shape to the pins is obstructed for engagement with the pins when the portion of the post fitting including the pins is received in the opening.

5. A scaffolding hoist coupling, in accordance with claim 4, the retaining means including a biasing means for biasing the locking members toward the first position.

6. A scaffolding hoist coupling, in accordance with claim 4, the retaining means including a depressible member operably connecting the locking members so that the depressible member can be depressed to move the locking members from the first position to the second position.

7. A scaffolding hoist coupling, in accordance with claim 6, further comprising a shield proximate the depressible member, at least partially shielding the depressible member from unintentional depression.

8. A scaffolding hoist coupling, in accordance with claim 4, further comprising a latch operably engageable with the locking members to secure the locking members in the first position.

9. A scaffolding hoist coupling, in accordance with claim 1, further comprising ballast to increase the weight of the coupling to help plumb the hoist line when the coupling is attached.

10. A scaffolding hoist coupling for lifting a scaffolding component, the component having an operably connected fitting having at least two projections extending transversely from an elongated post, comprising:

a housing having a first and second end and an opening in the first end, the opening generally corresponding in shape to a projection of the fitting taken transversely to the elongated post, the opening including a portion corresponding in shape to the projections extending transversely from the elongated post;

two approximately parallel elongate locking members slidably mounted within the housing proximate the opening, each locking member having a notch generally corresponding in shape to the portion of the opening generally corresponding in shape to the projections from the elongated post, the locking members being slidable between a first position and a second position so that when the locking members are in the second position, the notches are aligned with the portion of the opening generally corresponding in shape to the projections for receiving and removal of the fitting, and when the locking members are in the first position, the portion of the opening generally corresponding in shape to the projections is obstructed such that when the fitting, including the projections is received within the opening, the locking members engage the projections to retain the fitting within the housing; and fastening means, connected to the housing, for fastening the scaffolding hoist coupling to a hoist line.

11. A scaffolding hoist coupling, in accordance with claim 10, the housing being generally cylindrical and the fastening means being disposed proximate the second end of the housing opposite the opening.

12. A scaffolding hoist coupling, in accordance with claim 11, the fastening means including a loop fastened to the second end of the housing opposite the opening.

13. A scaffolding hoist coupling, in accordance with claim 10, further comprising ballast to increase the weight of the coupling to help plumb the hoist line when the coupling is attached.

* * * * *